United States Patent
Wang et al.

(10) Patent No.: US 11,802,961 B2
(45) Date of Patent: *Oct. 31, 2023

(54) LATERAL-BIN MONITORING FOR RADAR TARGET DETECTION

(71) Applicant: Aptiv Technologies Limited, St. Michael (BB)

(72) Inventors: Yu Wang, Troy, MI (US); Yang Wang, Novi, MI (US)

(73) Assignee: Aptiv Technologies Limited, St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 17/809,396

(22) Filed: Jun. 28, 2022

(65) Prior Publication Data

US 2022/0326375 A1 Oct. 13, 2022

Related U.S. Application Data

(63) Continuation of application No. 16/799,075, filed on Feb. 24, 2020, now Pat. No. 11,408,995.

(51) Int. Cl.
*G01S 13/931* (2020.01)
*G01S 7/41* (2006.01)
(Continued)

(52) U.S. Cl.
CPC ............ *G01S 13/931* (2013.01); *G01S 7/412* (2013.01); *G06V 20/58* (2022.01); *G01S 2013/932* (2020.01); *G01S 2013/9322* (2020.01)

(58) Field of Classification Search
CPC .. G01S 13/931; G01S 7/412; G01S 2013/932; G01S 2013/9322;
(Continued)

(56) References Cited

U.S. PATENT DOCUMENTS 4,622,556 A 11/1986 Bryant et al.
4,633,254 A 12/1986 Giaccari
(Continued)

FOREIGN PATENT DOCUMENTS

CN 1559842 A 1/2005
CN 101268383 A 9/2008
(Continued)

OTHER PUBLICATIONS

"European Search Report", EP Application No. 18208733, dated Apr. 22, 2019, 2 pages.
(Continued)

*Primary Examiner* — Bernarr E Gregory
(74) *Attorney, Agent, or Firm* — Sawtooth Patent Group PLLC

(57) ABSTRACT

Techniques and apparatuses are described that implement lateral-bin monitoring for radar target detection. In particular, a radar system, which is mounted to a moving platform, divides a region of interest that is associated with at least one side of the moving platform into multiple lateral bins. The radar system maps locations of detections to the lateral bins, and monitors respective quantities of consecutive frames in which detections occur within the lateral bins. The radar system determines that at least one object is present within one of the lateral bins responsive to a quantity of consecutive frames having detections within the lateral bin being equal to or greater than a threshold. By waiting for a lateral bin to have detections across multiple consecutive frames, the radar system can minimize the false-alarm rate without reducing sensitivity.

20 Claims, 10 Drawing Sheets

(51) Int. Cl.
*G06V 20/58* (2022.01)
*G01S 13/00* (2006.01)

(58) Field of Classification Search
CPC .......... G01S 2013/9315; G01S 13/325; G01S 13/343; G01S 13/582; G01S 13/584; G01S 2013/93274; G01S 13/93; G01S 7/4004; G01S 13/933; G01S 13/937; G06V 20/58

See application file for complete search history.

(56) References Cited

U.S. PATENT DOCUMENTS

| | | |
|---|---|---|
| 5,361,072 A | 11/1994 | Barrick et al. |
| 5,517,196 A | 5/1996 | Pakett et al. |
| 6,680,689 B1 | 1/2004 | Zoratti |
| 6,933,837 B2 | 8/2005 | Gunderson et al. |
| 7,786,849 B2 | 8/2010 | Buckley |
| 7,904,222 B2 | 3/2011 | Lee et al. |
| 8,665,078 B2 | 3/2014 | Wiemeersch et al. |
| 9,211,889 B1 | 12/2015 | Hoetzer et al. |
| 9,229,102 B1 | 1/2016 | Wright et al. |
| 9,296,423 B2 | 3/2016 | Rupp et al. |
| 9,373,044 B2 | 6/2016 | Wallat et al. |
| 9,477,894 B1 | 10/2016 | Reed et al. |
| 9,566,911 B2 | 2/2017 | Greenwood et al. |
| 9,594,155 B2 | 3/2017 | Cashler et al. |
| 9,796,228 B2 | 10/2017 | Hu et al. |
| 9,804,022 B2 | 10/2017 | Kyrtsos et al. |
| 9,910,151 B2 | 3/2018 | Cashler |
| 9,937,953 B2 | 4/2018 | Lavoie et al. |
| 9,975,480 B2 | 5/2018 | Lai et al. |
| 10,207,643 B2 | 2/2019 | Prasad et al. |
| 10,276,049 B2 | 4/2019 | Prasad et al. |
| 10,286,916 B2 | 5/2019 | Prasad et al. |
| 10,351,146 B2 | 7/2019 | Prasad et al. |
| 10,393,862 B2 | 8/2019 | Cashler et al. |
| 10,481,255 B2 | 11/2019 | Prasad et al. |
| 10,838,054 B2 | 11/2020 | Wang et al. |
| 10,955,540 B2 | 3/2021 | Wang et al. |
| 11,092,668 B2 | 8/2021 | Wang et al. |
| 11,408,995 B2* | 8/2022 | Wang .............. G01S 13/931 |
| 2008/0088499 A1* | 4/2008 | Bonthron .............. G01S 13/931 342/104 |
| 2008/0169938 A1 | 7/2008 | Madau |
| 2008/0186204 A1 | 8/2008 | Buckley |
| 2009/0005932 A1 | 1/2009 | Lee et al. |
| 2010/0109938 A1 | 5/2010 | Oswald et al. |
| 2011/0140872 A1 | 6/2011 | McClure |
| 2011/0257860 A1 | 10/2011 | Getman et al. |
| 2012/0041659 A1 | 2/2012 | Greene |
| 2012/0169523 A1 | 7/2012 | Lee et al. |
| 2013/0027195 A1 | 1/2013 | Wiemeersch et al. |
| 2013/0169425 A1 | 7/2013 | Victor et al. |
| 2013/0176161 A1 | 7/2013 | Derham et al. |
| 2013/0222592 A1 | 8/2013 | Gieseke |
| 2013/0226390 A1 | 8/2013 | Luo et al. |
| 2013/0251194 A1 | 9/2013 | Schamp |
| 2014/0085472 A1 | 3/2014 | Lu et al. |
| 2014/0160276 A1 | 6/2014 | Pliefke et al. |
| 2014/0160279 A1 | 6/2014 | Grossnickle et al. |
| 2014/0176716 A1 | 6/2014 | Wallat et al. |
| 2014/0218522 A1 | 8/2014 | Lavoie et al. |
| 2014/0222288 A1 | 8/2014 | Lavoie et al. |
| 2014/0267688 A1 | 9/2014 | Aich et al. |
| 2014/0267689 A1 | 9/2014 | Lavoie |
| 2014/0277942 A1 | 9/2014 | Kyrtsos et al. |
| 2014/0292554 A1 | 10/2014 | Smith et al. |
| 2014/0303849 A1 | 10/2014 | Hafner et al. |
| 2015/0120141 A1 | 4/2015 | Lavoie et al. |
| 2016/0023598 A1* | 1/2016 | Kohler .................. G01S 13/931 340/435 |
| 2016/0041258 A1 | 2/2016 | Cashler et al. |
| 2016/0084943 A1 | 3/2016 | Arage |
| 2016/0098604 A1 | 4/2016 | Min |
| 2016/0101811 A1 | 4/2016 | Kyrtsos et al. |
| 2016/0116916 A1* | 4/2016 | Pink ...................... G01S 13/931 701/23 |
| 2016/0153778 A1 | 6/2016 | Singh et al. |
| 2016/0167651 A1 | 6/2016 | Schwindt et al. |
| 2016/0203374 A1 | 7/2016 | Zeng et al. |
| 2016/0209211 A1 | 7/2016 | Song et al. |
| 2016/0252610 A1 | 9/2016 | Smith et al. |
| 2016/0297361 A1 | 10/2016 | Drazan et al. |
| 2017/0001566 A1 | 1/2017 | Lu et al. |
| 2017/0080928 A1 | 3/2017 | Wasiek et al. |
| 2017/0177949 A1 | 6/2017 | Hu et al. |
| 2017/0217368 A1 | 8/2017 | Lewis et al. |
| 2017/0242443 A1 | 8/2017 | Schuh et al. |
| 2017/0305436 A1 | 10/2017 | Maskell et al. |
| 2017/0363727 A1 | 12/2017 | Prasad et al. |
| 2017/0363728 A1 | 12/2017 | Prasad et al. |
| 2018/0011172 A1 | 1/2018 | Cashler et al. |
| 2018/0025499 A1 | 1/2018 | Strano et al. |
| 2018/0045823 A1 | 2/2018 | Prasad et al. |
| 2018/0061239 A1 | 3/2018 | Prasad et al. |
| 2018/0068447 A1 | 3/2018 | Prasad et al. |
| 2018/0068566 A1 | 3/2018 | Prasad et al. |
| 2018/0203106 A1 | 7/2018 | Di et al. |
| 2019/0033442 A1 | 1/2019 | Millar et al. |
| 2019/0086204 A1 | 3/2019 | Critchley et al. |
| 2019/0170867 A1 | 6/2019 | Wang et al. |
| 2019/0228258 A1 | 7/2019 | Bell et al. |
| 2019/0232964 A1 | 8/2019 | Lindholm |
| 2019/0308473 A1 | 10/2019 | Yu et al. |
| 2019/0335100 A1 | 10/2019 | Chen et al. |
| 2019/0347498 A1 | 11/2019 | Herman et al. |
| 2020/0079165 A1 | 3/2020 | Niewiadomski et al. |
| 2020/0081117 A1 | 3/2020 | Tapia et al. |
| 2020/0110163 A1 | 4/2020 | Wang et al. |
| 2020/0256953 A1 | 8/2020 | Wang et al. |
| 2021/0011145 A1 | 1/2021 | Wang et al. |
| 2021/0141075 A1 | 5/2021 | Wang et al. |
| 2021/0333382 A1 | 10/2021 | Wang et al. |

FOREIGN PATENT DOCUMENTS

| | | |
|---|---|---|
| CN | 102609953 A | 7/2012 |
| CN | 203047062 U | 7/2013 |
| CN | 103529438 A | 1/2014 |
| CN | 104890671 A | 9/2015 |
| CN | 205044655 U | 2/2016 |
| CN | 105501114 A | 4/2016 |
| CN | 109997057 A | 7/2019 |
| CN | 110133610 A | 8/2019 |
| CN | 110632586 A | 12/2019 |
| DE | 2548181 A1 | 5/1977 |
| DE | 10312548 | 5/2004 |
| DE | 10325192 A1 | 1/2005 |
| DE | 102004059596 A1 | 6/2006 |
| DE | 102005019550 A1 | 11/2006 |
| DE | 102005042729 A1 | 3/2007 |
| DE | 102006028625 A1 | 10/2007 |
| DE | 102009007990 A1 | 8/2010 |
| DE | 102014107917 A1 | 9/2015 |
| DE | 102016200642 A1 | 7/2017 |
| EP | 2045155 A1 | 4/2009 |
| EP | 2551132 A1 | 1/2013 |
| EP | 2942766 A1 | 11/2015 |
| EP | 2983006 A1 | 2/2016 |
| EP | 3021140 A1 | 5/2016 |
| EP | 3031687 A2 | 6/2016 |
| EP | 3260884 A1 | 12/2017 |
| EP | 3267222 A1 | 1/2018 |
| EP | 3291205 A1 | 3/2018 |
| GB | 2435138 A | 8/2007 |
| GB | 2447672 A | 9/2008 |
| GB | 2505666 A | 3/2014 |
| GB | 2518857 A | 4/2015 |
| JP | H09267762 A | 10/1997 |
| JP | 2002068032 A | 3/2002 |
| WO | 2006114206 A1 | 11/2006 |
| WO | 2007028433 A1 | 3/2007 |
| WO | 2016015938 A1 | 2/2016 |

(56) References Cited

FOREIGN PATENT DOCUMENTS

OTHER PUBLICATIONS

"European Search Report", EP Application No. 18208733, dated Sep. 6, 2019, 2 pages.
"European Search Report", EP Application No. 19199564, dated Feb. 20, 2020, 2 pages.
"European Search Report", EP Application No. 20152210, dated Mar. 23, 2020, 2 pages.
"Extended European Search Report", EP Application No. 17174836.1, dated Nov. 22, 2017, 10 pages.
"Extended European Search Report", EP Application No. 17174842.9, dated Nov. 23, 2017, 10 pages.
"Extended European Search Report", EP Application No. 17176204.0, dated Dec. 8, 2017, 7 pages.
"Extended European Search Report", EP Application No. 17184001.0, dated Jan. 12, 2018, 8 pages.
"Extended European Search Report", EP Application No. 17186999.3, dated Jan. 17, 2018, 7 pages.
"Extended European Search Report", EP Application No. 17187300.3, dated Jan. 17, 2018, 7 pages.
"Extended European Search Report", EP Application No. 21151400.5, dated Jun. 18, 2021, 12 pages.
"Extended European Search Report", EP Application No. 21169450.0, dated Jul. 15, 2021, 8 pages.
"Extended European Search Report", EP Application No. 17188610.4, dated Feb. 13, 2018, 8 pages.
"Foreign Office Action", CN Application No. 201710464625.7, dated Jun. 17, 2020, 9 pages.
"Foreign Office Action", CN Application No. 201710464625.7, dated Jul. 11, 2019, 12 pages.
"Foreign Office Action", CN Application No. 201710464962.6, dated Mar. 10, 2020, 18 pages.
"Foreign Office Action", CN Application No. 201710542068.6, dated Mar. 9, 2020, 12 pages.
"Foreign Office Action", CN Application No. 201710806769.6, dated Jun. 9, 2020, 17 pages.
"Foreign Office Action", CN Application No. 201710806769.6, dated Dec. 4, 2019, 20 pages.
"Foreign Office Action", EP Application No. 17184001.0, dated May 3, 2021, 5 pages.
"Foreign Office Action", EP Application No. 17187300.3, dated May 14, 2020, 4 pages.
Homm, et al., "Efficient Occupancy Grid Computation on the GPU with Lidar and Radar for Road Boundary Detection", Jun. 2010, 8 pages.
"Foreign Office Action", EP Application No. 21151400.5, dated Sep. 6, 2022, 5 pages.
"Foreign Office Action", CN Application No. 202110204067.7, dated Jun. 22, 2023, 25 pages.

\* cited by examiner

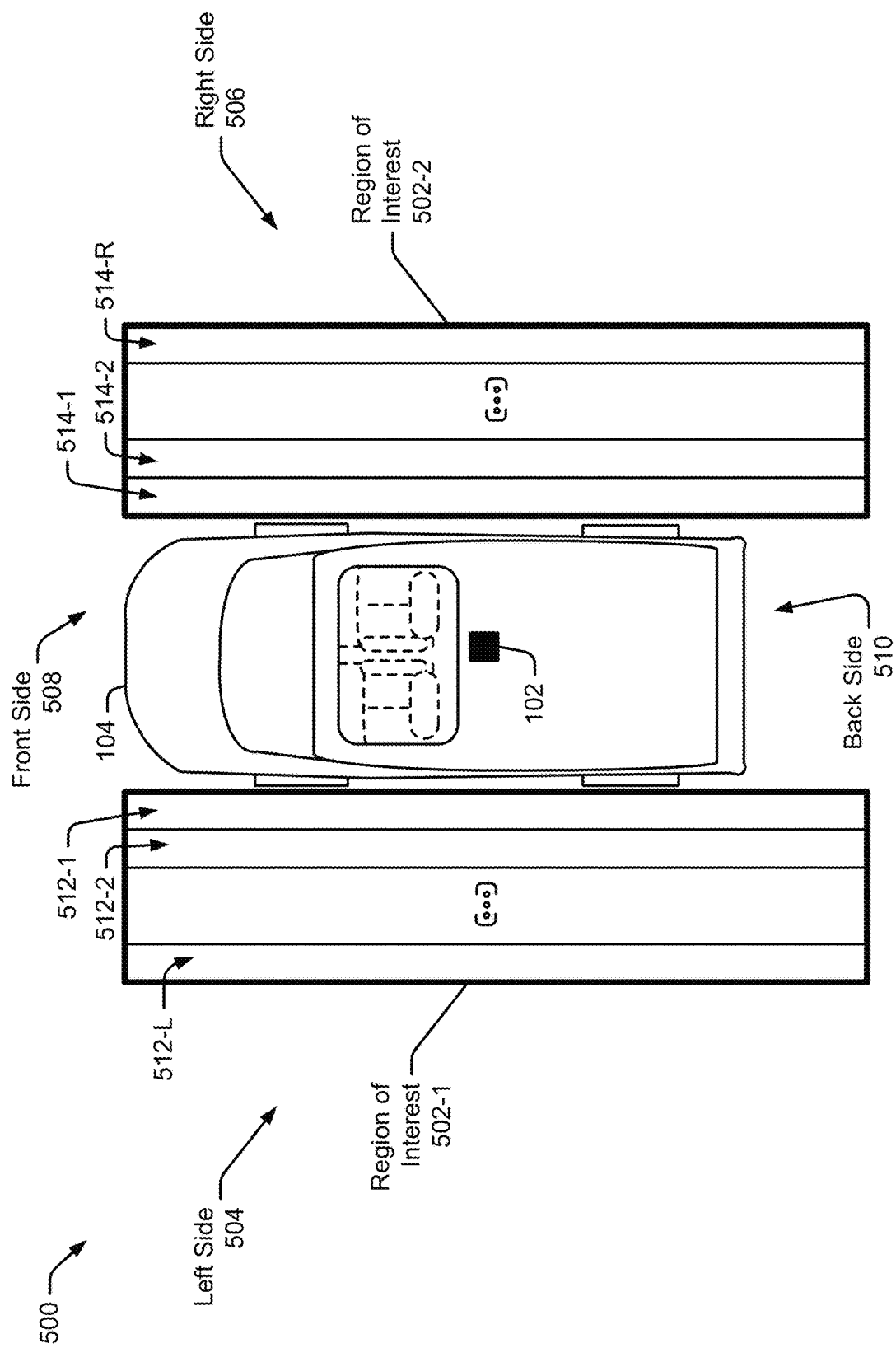

LATERAL-BIN MONITORING FOR RADAR TARGET DETECTION

CROSS-REFERENCE TO RELATED APPLICATION

This application is a continuation of U.S. patent application Ser. No. 16/799,075, filed Feb. 24, 2020, now U.S. Pat. No. 11,408,995, the entire disclosure of which is hereby incorporated herein by reference.

BACKGROUND

Radars are useful devices that can detect and track objects. Relative to other types of sensors, like a camera, a radar can provide improved performance in the presence of different environmental conditions, such as low lighting and fog, or with moving or overlapping objects. Accordingly, radar provides many advantages for autonomous-driving applications or driver-assistance applications.

Sometimes, however, interference or noise in the external environment can cause the radar to report an erroneous detection (i.e., a false detection). Some techniques may increase a detection threshold to reduce a probability of the erroneous detection occurring. However, this can also make the radar less sensitive to detecting small-sized objects or objects at farther distances.

SUMMARY

Techniques and apparatuses are described that implement lateral-bin monitoring for radar target detection. In particular, a radar system, which is mounted to a moving platform, divides a region of interest that is associated with at least one side of the moving platform into multiple lateral bins. The radar system maps locations of detections to the lateral bins, and monitors respective quantities of consecutive frames in which detections occur within the lateral bins. The radar system determines that at least one object is present within one of the lateral bins responsive to a quantity of consecutive frames having detections within the lateral bin being equal to a threshold. By waiting for a lateral bin to have detections across multiple consecutive frames, the radar system can minimize the false alarm rate without reducing sensitivity. The threshold can also be dynamically adjusted based on a speed of the moving platform and/or a speed of the object. In this way, the radar system can respond quickly with a low false alarm rate whether detecting fast-moving or stationary objects.

Aspects described below include a method performed by a radar system that is mounted to a mobile platform. The method includes the radar system defining a region of interest that is on at least one side of the mobile platform. The region of interest comprises a plurality of lateral bins having lengths that span at least a portion of the at least one side of the mobile platform. The method also includes transmitting and receiving a radar signal that propagates through at least a portion of the region of interest, the radar signal comprising multiple frames. The method additionally includes monitoring a quantity of consecutive frames of the multiple frames that have detections located within at least one lateral bin of the plurality of lateral bins. The detections are determined from the received radar signal. Responsive to the quantity of consecutive frames with detections being greater than or equal to a threshold, the method includes determining that at least one object is present within the at least one lateral bin.

Aspects described below also include an apparatus comprising a radar system with at least one antenna array, a transceiver coupled to the antenna array, and a processor coupled to the transceiver. The transceiver is configured to transmit and receive a radar signal using the antenna array. The radar signal propagates through at least a portion of a region of interest. The radar signal comprises multiple frames. The processor is configured to define the region of interest. The region of interest is on at least one side of the apparatus. The region of interest comprises a plurality of lateral bins with lengths that span at least a portion of the at least one side of the apparatus. The processor is also configured to monitor a quantity of consecutive frames of the multiple frames that have detections located within at least one lateral bin of the plurality of lateral bins. The detections determined from the received radar signal. The processor is additionally configured to determine that at least one object is present within the at least one lateral bin responsive to the quantity of consecutive frames with detections being greater than or equal to a threshold.

Aspects described below also include computer-readable storage media comprising computer-executable instructions that, responsive to execution by a processor, implement a lateral-bin monitoring module. The lateral-bin monitoring module is configured to accept multiple radar data cubes that are respectively associated with multiple frames of a radar receive signal. The lateral-bin monitoring module is also configured to monitor quantities of consecutive frames having detections located within respective lateral bins. The detections are determined based on the multiple radar data cubes. The quantities of consecutive frames comprise a particular quantity of consecutive frames having detections located within a particular lateral bin of the respective lateral bins. The lateral-bin monitoring module is configured to determine that at least one object is present within the particular lateral bin responsive to the particular quantity of consecutive frames with detections being greater than or equal to a threshold.

Aspects described below also include a system with means for performing lateral-bin monitoring for radar target detection.

This summary is provided to introduce simplified concepts for performing lateral-bin monitoring, which are further described below in the Detailed Description and Drawings. For ease of description, the disclosure focuses on automotive radar systems; however, the techniques are not limited to automobiles. The techniques also apply to radars of other types of vehicles, systems, and moving platforms. This summary is not intended to identify essential features of the claimed subject matter, nor is it intended for use in determining the scope of the claimed subject matter.

BRIEF DESCRIPTION OF THE DRAWINGS

The details of one or more aspects of lateral-bin monitoring for radar target detection are described in this document with reference to the following figures. The same numbers are used throughout the drawings to reference like features and components:

FIG. 4-1 illustrates transmitting portions of an example antenna array and an example transceiver of a radar system.

FIG. 4-2 illustrates receiving portions of an example antenna array and an example transceiver of a radar system.

FIG. 4-3 illustrates an example scheme implemented by a processor of a radar system for performing lateral-bin monitoring for target detection.

FIG. 5 illustrates example lateral bins defined by a lateral-bin monitoring module of a radar system.

DETAILED DESCRIPTION

Overview

Using a radar for autonomous-driving applications or driver-assistance applications can be challenging. Sometimes, for instance, interference or noise in the external environment can cause the radar to report an erroneous detection (i.e., a false detection). Some techniques may try to reduce a probability of the erroneous detection occurring by increasing a detection threshold. The detection threshold is used to specify a minimum amplitude for detecting an object. Although increasing the detection threshold can reduce a probability that interference or noise has an amplitude that exceeds the detection threshold thereby minimizing erroneous detections, this can also make it challenging to detect small-sized objects, objects with small radar cross sections, or objects at far distances.

In contrast, this document describes techniques and devices that implement lateral-bin monitoring for radar target detection. In particular, a radar system, which is mounted to a moving platform, divides a region of interest that is associated with at least one side of the moving platform into multiple lateral bins. The radar system maps locations of detections to the lateral bins, and monitors respective quantities of consecutive frames in which detections occur within the lateral bins. The radar system determines that at least one object is present within one of the lateral bins responsive to a quantity of consecutive frames having detections within the lateral bin being equal to a threshold. By waiting for a lateral bin to have detections across multiple consecutive frames, the radar system can minimize the false-alarm rate without reducing sensitivity. The threshold can also be dynamically adjusted based on a speed of the moving platform and/or a speed of the object. In this way, the radar system can respond quickly with a low false-alarm rate whether detecting moving or stationary objects.

Example Environment

Figure 1:
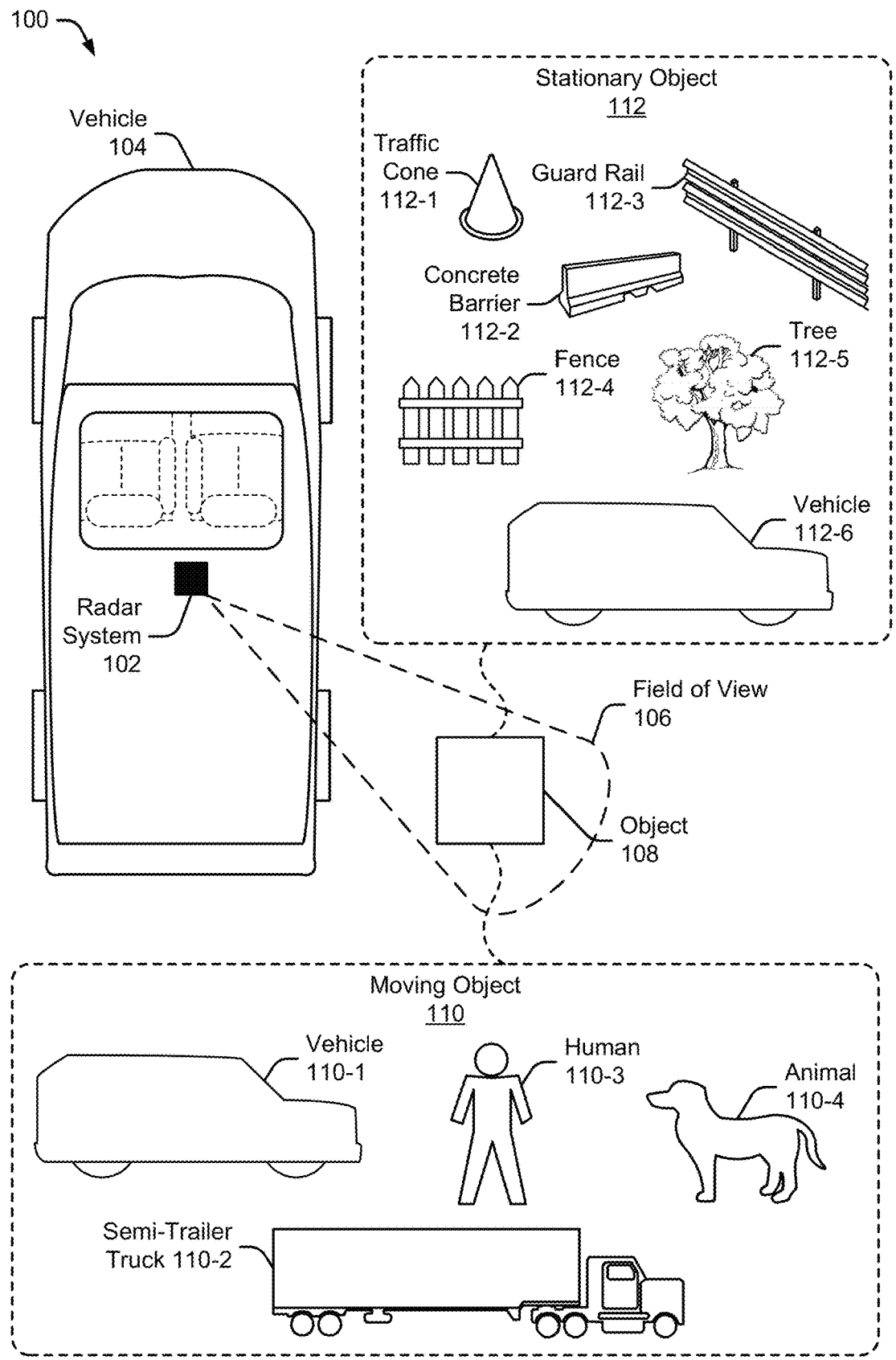
FIG. 1 illustrates an example environment in which a radar system capable of performing lateral-bin monitoring for radar target detection can be implemented.

FIG. 1 is an illustration of an example environment 100 in which techniques using, and an apparatus including, a radar system 102 capable of performing lateral-bin monitoring for target detection may be embodied. In the depicted environment 100, the radar system 102 is mounted to, or integrated within, a vehicle 104. The radar system 102 is capable of detecting one or more objects 108 that are within proximity to the vehicle 104. Although illustrated as car, the vehicle 104 can represent other types of motorized vehicles (e.g., a motorcycle, a bus, a tractor, a semi-trailer truck, or construction equipment), types of non-motorized vehicles (e.g., a bicycle), types of railed vehicles (e.g., a train or a trolley car), watercraft (e.g., a boat or a ship), aircraft (e.g., an airplane or a helicopter), or spacecraft (e.g., satellite). In some cases, the vehicle 104 can tow, or include, a trailer or other attachments. In general, the radar system 102 can be mounted to any type of moving platform, including moving machinery or robotic equipment.

In the depicted implementation, the radar system 102 is mounted on top of the vehicle 104 and provides a field of view 106 illuminating the object 108. In other implementations, the radar system 102 can be mounted to a front side, a backside, a left side, or a right side of the vehicle 104. In some cases, the vehicle 104 includes multiple radar systems 102, such as a first rear-mounted radar system 102 positioned near a left side of the vehicle 104 and a second rear-mounted radar system 102 positioned near a right side of the vehicle 104. In general, locations of the one or more radar systems 102 can be designed to provide a particular field of view 106 that encompasses a region of interest in which the object 108 may be present. Example fields of view 106 include a 360-degree field of view, one or more 180-degree fields of view, one or more 90-degree fields of view, and so forth, which can overlap (e.g., four 120-degree fields of view).

In general, the object 108 is composed of one or more materials that reflect radar signals. Depending on the application, the object 108 can represent a target of interest or clutter. In some cases, the object 108 is a moving object 110, such as another vehicle 110-1, a semi-trailer truck 110-2, a human 110-3, or an animal 110-4. In other cases, the object 108 represents a stationary object 112, such as traffic cone 112-1, a concrete barrier 112-1, a guard rail 112-3, a fence 112-4, a tree 112-5, or a parked vehicle 112-6. The stationary object 112 may even comprise a road barrier, which can be continuous or discontinuous along a portion of the road. The radar system 102 and the vehicle 104 are further described with respect to FIG. 2.

Figure 2:
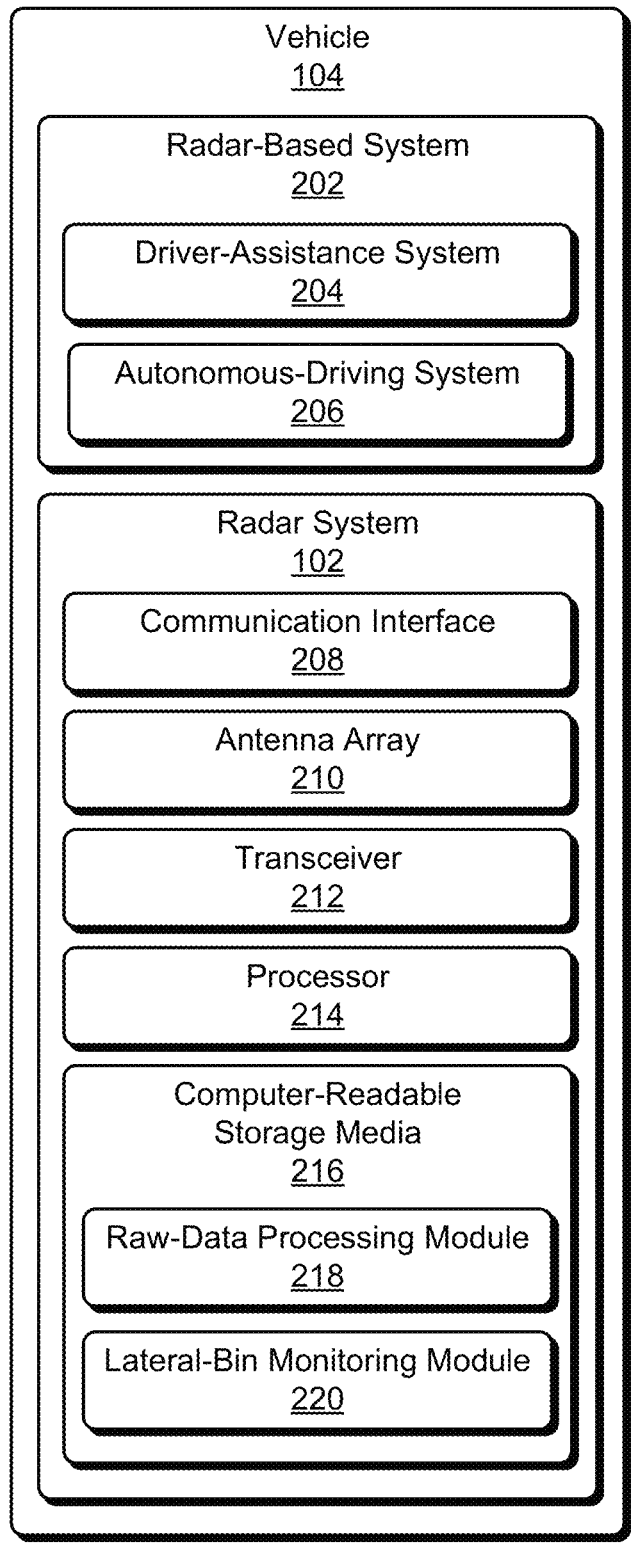
FIG. 2 illustrates an example implementation of a radar system as part of a vehicle.

FIG. 2 illustrates the radar system 102 as part of the vehicle 104. The vehicle 104 includes a radar-based system 202, such as a driver-assistance system 204 and/or an autonomous-driving system 206. Generally, the radar-based system 202 uses radar data provided by the radar system 102 to perform a function. For example, the driver-assistance system 204 provides blind-spot monitoring and generates an alert that indicates a potential collision with an object 108 that is detected by the radar system 102. In this case, the radar data from the radar system 102 indicates when it is safe or unsafe to change lanes.

As another example, the driver-assistance system 204 suppresses alerts responsive to the radar system 102 indicating that the object 108 represents a stationary object 112, such as a road barrier. In this way, the driver-assistance system 204 can avoid annoying the driver with alerts while the vehicle 104 is driving next to the road barrier. This can also be beneficial in situations in which reflections from the road barrier generate false detections that appear to be moving objects. This can happen, for instance, if the radar signal propagates between the road barrier and a moving object, such as the vehicle 104 or a trailer towed by the vehicle 104, before returning directly or indirectly to the radar system 102. By suppressing the alerts, these false detections will not cause the driver-assistance system 204 to alert the driver.

The autonomous-driving system 206 may move the vehicle 104 to a particular location while avoiding collisions with other objects 108 detected by the radar system 102. The radar data provided by the radar system 102 can provide information about the location and movement of the other objects 108 to enable the autonomous-driving system 206 to perform emergency braking, perform a lane change, or adjust the vehicle 104's speed.

The radar system 102 includes a communication interface 208 to transmit the radar data to the radar-based system 202 or to another component of the vehicle 104 over a communication bus of the vehicle 104, for example, when the individual components shown in the radar system 102 are integrated within the vehicle 104. In general, the radar data provided by the communication interface 208 is in a format usable by the radar-based system 202. In some implementations, the communication interface 208 may provide information to the radar system 102, such as the speed of the vehicle 104 or whether a turning blinker is on or off. The radar system 102 can use this information to appropriately configure itself. For example, the radar system 102 can determine an absolute speed of the object 108 by compensating for the speed of the vehicle 104. Alternatively, the radar system 102 can dynamically adjust the field of view 106 based on whether a right-turning blinker or a left-turning blinker is on.

The radar system 102 also includes at least one antenna array 210 and at least one transceiver 212 to transmit and receive radar signals. The antenna array 210 includes at least one transmit antenna element and at least one receive antenna element. In some situations, the antenna array 210 includes multiple transmit antenna elements and multiple receive antenna elements to implement a multiple-input multiple-output (MIMO) radar capable of transmitting multiple distinct waveforms at a given time (e.g., a different waveform per transmit antenna element). The antenna elements can be circularly polarized, horizontally polarized, vertically polarized, or a combination thereof.

Using the antenna array 210, the radar system 102 can form beams that are steered or un-steered, and wide or narrow. The steering and shaping can be achieved through analog beamforming or digital beamforming. The one or more transmitting antenna elements can have, for instance, an un-steered omnidirectional radiation pattern or can produce a wide steerable beam to illuminate a large volume of space. To achieve target angular accuracies and angular resolutions, the receiving antenna elements can be used to generate hundreds of narrow steered beams with digital beamforming. In this way, the radar system 102 can efficiently monitor an external environment and detect one or more objects 108 within a region of interest.

The transceiver 212 includes circuitry and logic for transmitting and receiving radar signals via the antenna array 210. Components of the transceiver 212 can include amplifiers, mixers, switches, analog-to-digital converters, or filters for conditioning the radar signals. The transceiver 212 also includes logic to perform in-phase/quadrature (I/Q) operations, such as modulation or demodulation. A variety of modulations can be used, including linear frequency modulations, triangular frequency modulations, stepped frequency modulations, or phase modulations. The transceiver 212 can be configured to support continuous-wave or pulsed radar operations.

A frequency spectrum (e.g., range of frequencies) that the transceiver 212 uses to generate the radar signals can encompass frequencies between one and four hundred gigahertz (GHz), between four and one hundred GHz, or between approximately seventy and eighty GHz. The bandwidths can be less than one GHz, such as between approximately three hundred megahertz (MHz) and five hundred MHz.

The radar system 102 also includes one or more processors 214 and computer-readable storage media (CRM) 216.

The CRM 216 includes a raw-data processing module 218 and a lateral-bin monitoring module 220. The raw-data processing module 218 and the lateral-bin monitoring module 220 can be implemented using hardware, software, firmware, or a combination thereof. In this example, the processor 214 implements the raw-data processing module 218 and the lateral-bin monitoring module 220. Together, the raw-data processing module 218 and the lateral-bin monitoring module 220 enable the processor 214 to process responses from the receive antenna elements in the antenna array 210 to detect the object 108 and generate the radar data for the radar-based system 202.

The raw-data processing module 218 transforms raw data provided by the transceiver 212 into a radar data cube (shown in FIG. 4-3), which can be processed by the lateral-bin monitoring module 220. The lateral-bin monitoring module 220 analyzes the radar data cube to map one or more detections to a lateral bin. The lateral-bin monitoring module 220 maintains counters for each lateral bin. Each counter tracks a quantity of consecutive frames that have detections located within the corresponding lateral bin. The lateral-bin monitoring module 220 determines whether or not an object is present within the lateral bin based on the quantity of consecutive frames with detections. An operation of the lateral-bin monitoring module 220 is further described with respect to FIG. 6.

The lateral-bin monitoring module 220 produces the radar data for the radar-based system 202. Example types of radar data include a Boolean value that indicates whether or not the object 108 is present within a particular region of interest, a number that represents a characteristic of the object 108 (e.g., position, speed, or direction of motion), a value that indicates the type of object 108 detected (e.g., a moving object 110 or a stationary object 112).

Figure 3:
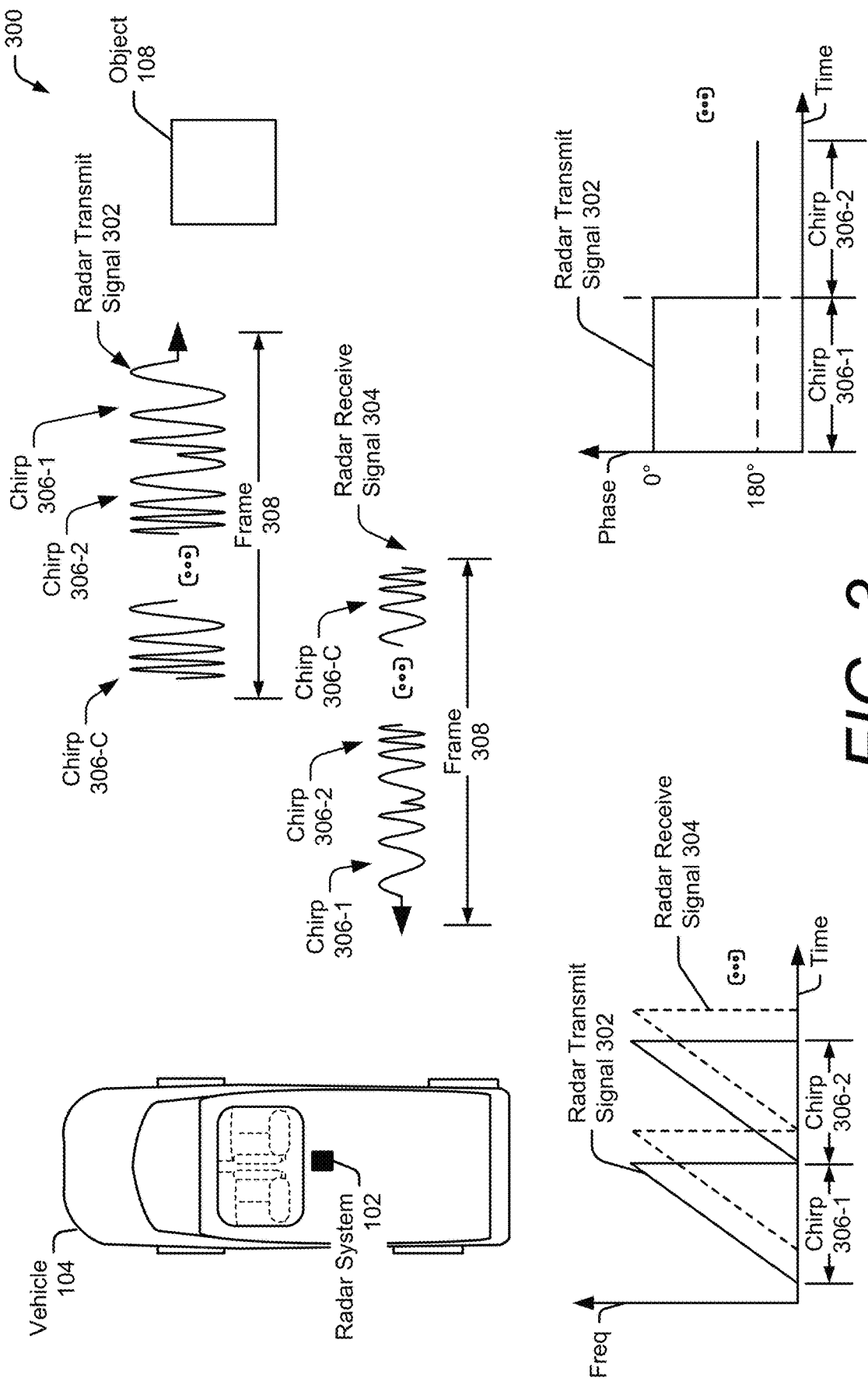
FIG. 3 illustrates an operation of an example radar system.

FIG. 3 illustrates an example operation of the radar system 102. In the depicted configuration, the radar system 102 is implemented as a frequency-modulated continuous-wave (FMCW) MIMO radar. However, other types of radar architectures can be implemented, as described above with respect to FIG. 2. In environment 300, the object 108 is located at a particular slant range and angle from the radar system 102. To detect the object 108, the radar system 102 transmits a radar transmit signal 302. At least a portion of the radar transmit signal 302 is reflected by the object 108. This reflected portion represents a radar receive signal 304. The radar system 102 receives the radar receive signal 304 and processes the radar receive signal 304 to extract data for the radar-based system 202 (of FIG. 2). As depicted, an amplitude of the radar receive signal 304 is smaller than an amplitude of the radar transmit signal 302 due to losses incurred during propagation and reflection.

Although the radar transmit signal 302 is illustrated as having a single waveform, the radar transmit signal 302 can be composed of multiple radar transmit signals 302 that have distinct waveforms to support MIMO operations. Likewise, the radar receive signal 304 can be composed of multiple radar receive signals 302 that also have different waveforms.

The radar transmit signal 302 includes one or more chirps 306-1 to 306-C, where C represents a positive integer. The radar system 102 can transmit the chirps 306-1 to 306-C in a continuous sequence, or transmit the chirps 306-1 to 306-C as time-separated pulses. The chirps 306-1 to 306-C represent a frame 308 (or scan). The radar transmit signal 302 can include multiple frames 308, or multiple sets of chirps 306-1 to 306-C. As an example, a quantity of the chirps 306 within a frame 308 can be on the order of several tens of chirps (e.g., C can equal 32, 64, or 128). A duration of the frame 308 can be on the order of milliseconds (ms), such as approximately 8 ms, 15 ms, or 30 ms.

Individual frequencies of the chirps 306-1 to 306-C can increase or decrease over time. In the depicted example, the radar system 102 employs a single-slope cycle to linearly increase the frequencies of the chirps 306-1 to 306-C over time. Other types of frequency modulations are also possible, including a two-slope cycle and/or a non-linear frequency modulation. In general, transmission characteristics of the chirps 306-1 to 306-C (e.g., bandwidth, center frequency, duration, and transmit power) can be tailored to achieve a particular detection range, range resolution, or doppler resolution for detecting the object 108.

Additionally, the radar system 102 can employ a spread spectrum technique, such as code-division multiple access (CDMA), to support MIMO operations. In the depicted example, the radar system 102 uses binary phase-shift keying (BPSK) to encode each frame 308. For example, a coding sequence is applied to each frame 308 of the radar transmit signal 302. The coding sequence determines the phase of each one of the chirps 306-1 to 306-C within the frame 308. In this example, the second chirp 306-1 has a phase that is offset by 180 degrees from the phase of the first chirp 306-1.

At the radar system 102, the radar receive signal 304 represents a delayed version of the radar transmit signal 302. The amount of delay is proportional to the slant range (e.g., distance) from the antenna array 210 of the radar system 102 to the object 108. In particular, this delay represents a summation of a time it takes for the radar transmit signal 302 to propagate from the radar system 102 to the object 108 and a time it takes for the radar receive signal 304 to propagate from the object 108 to the radar system 102. If the object 108 and/or the radar system 102 is moving, the radar receive signal 304 is shifted in frequency relative to the radar transmit signal 302 due to the Doppler effect. In other words, characteristics of the radar receive signal 304 are dependent upon motion of the object 108 and/or motion of the vehicle 104. Similar to the radar transmit signal 302, the radar receive signal 304 is composed of one or more of the chirps 306-1 to 306-C. The multiple chirps 306-1 to 306-C enable the radar system 102 to make multiple observations of the object 108 over a time period of the frame 308. The transmission of the radar transmit signal 302 and the reception of the radar receive signal 304 are further described with respect to FIGS. 4-1 and 4-2, respectively.

Figures 1, 4:
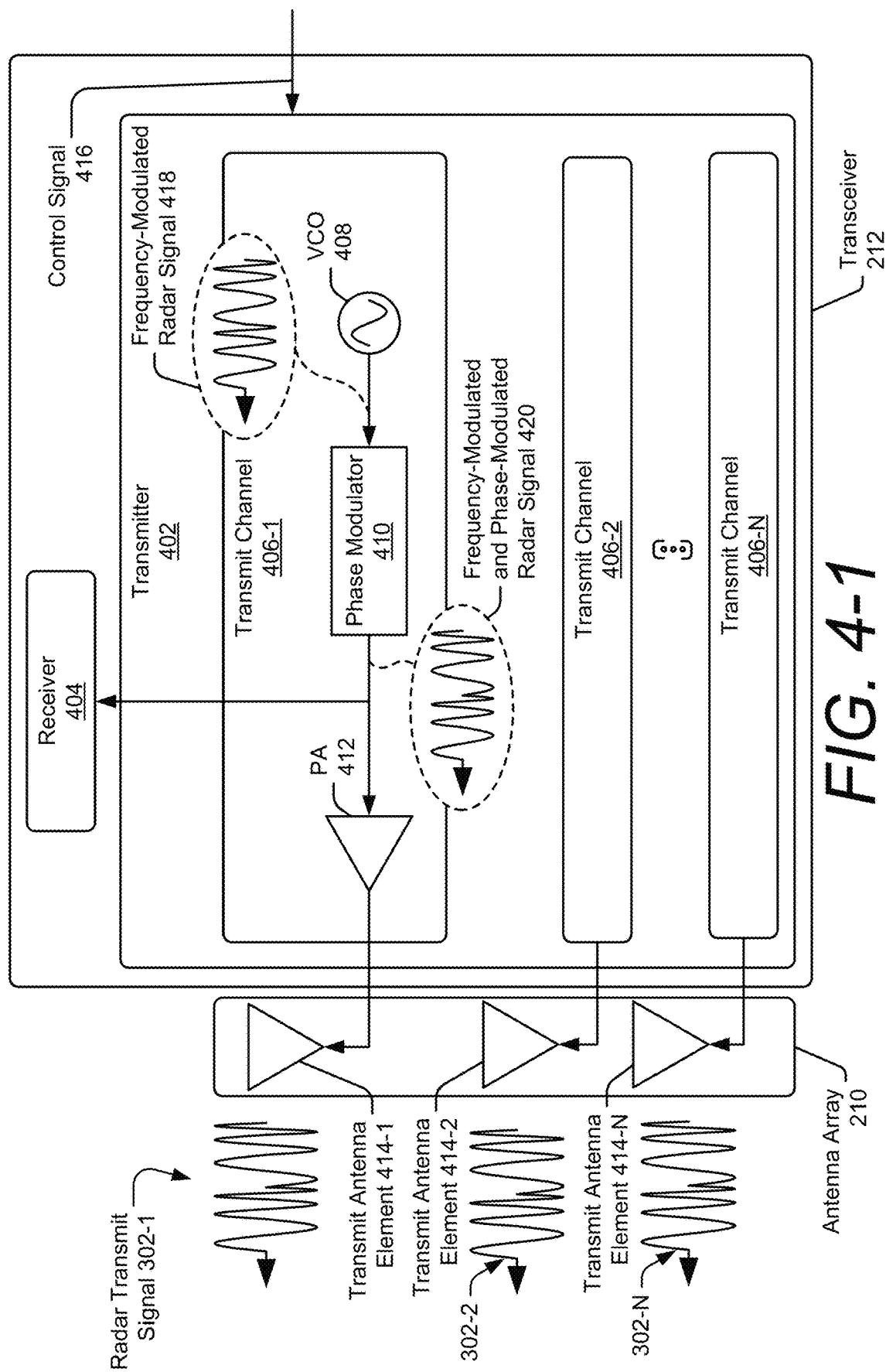
Figures 2, 4:
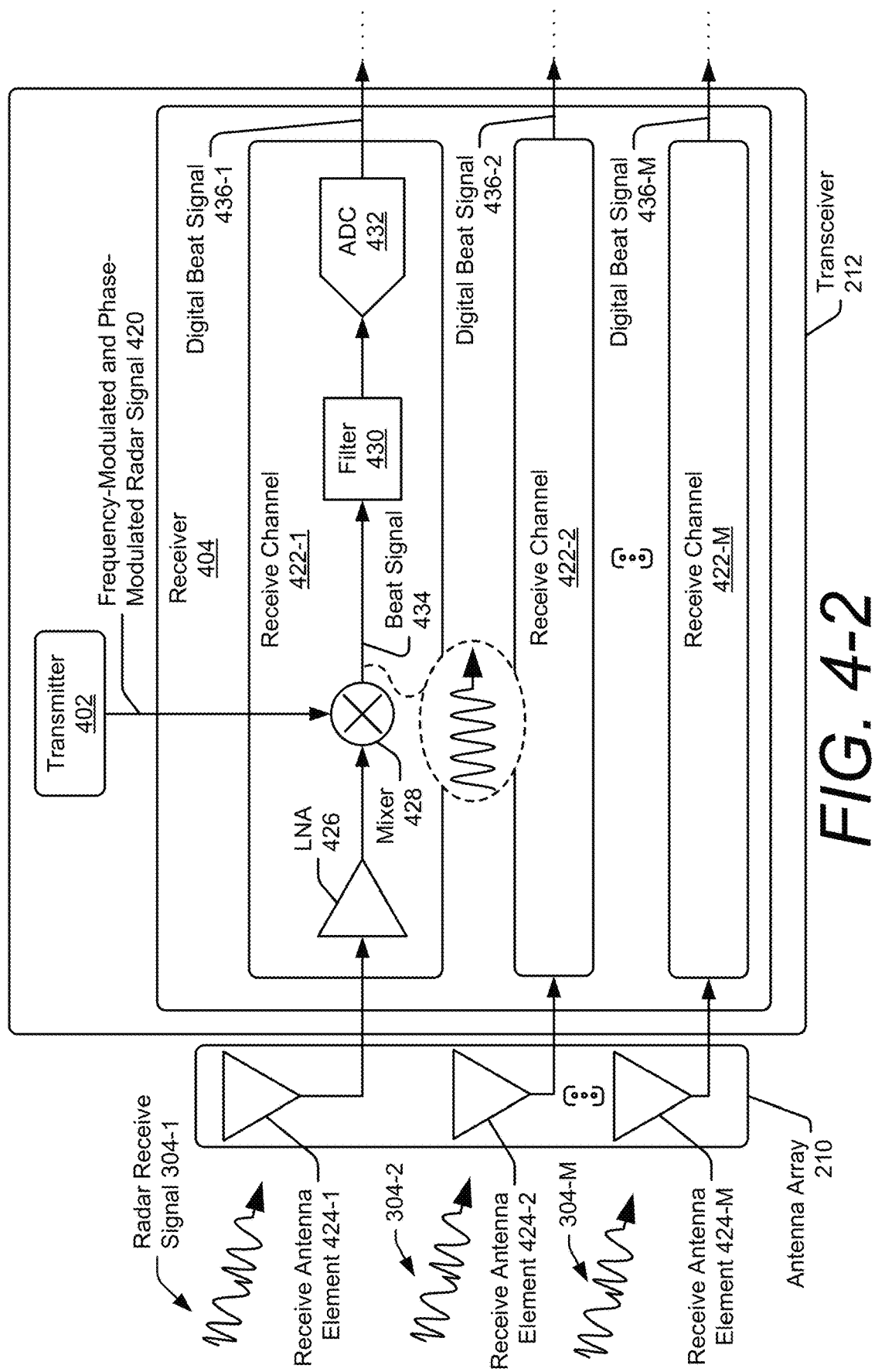
Figures 3, 4:
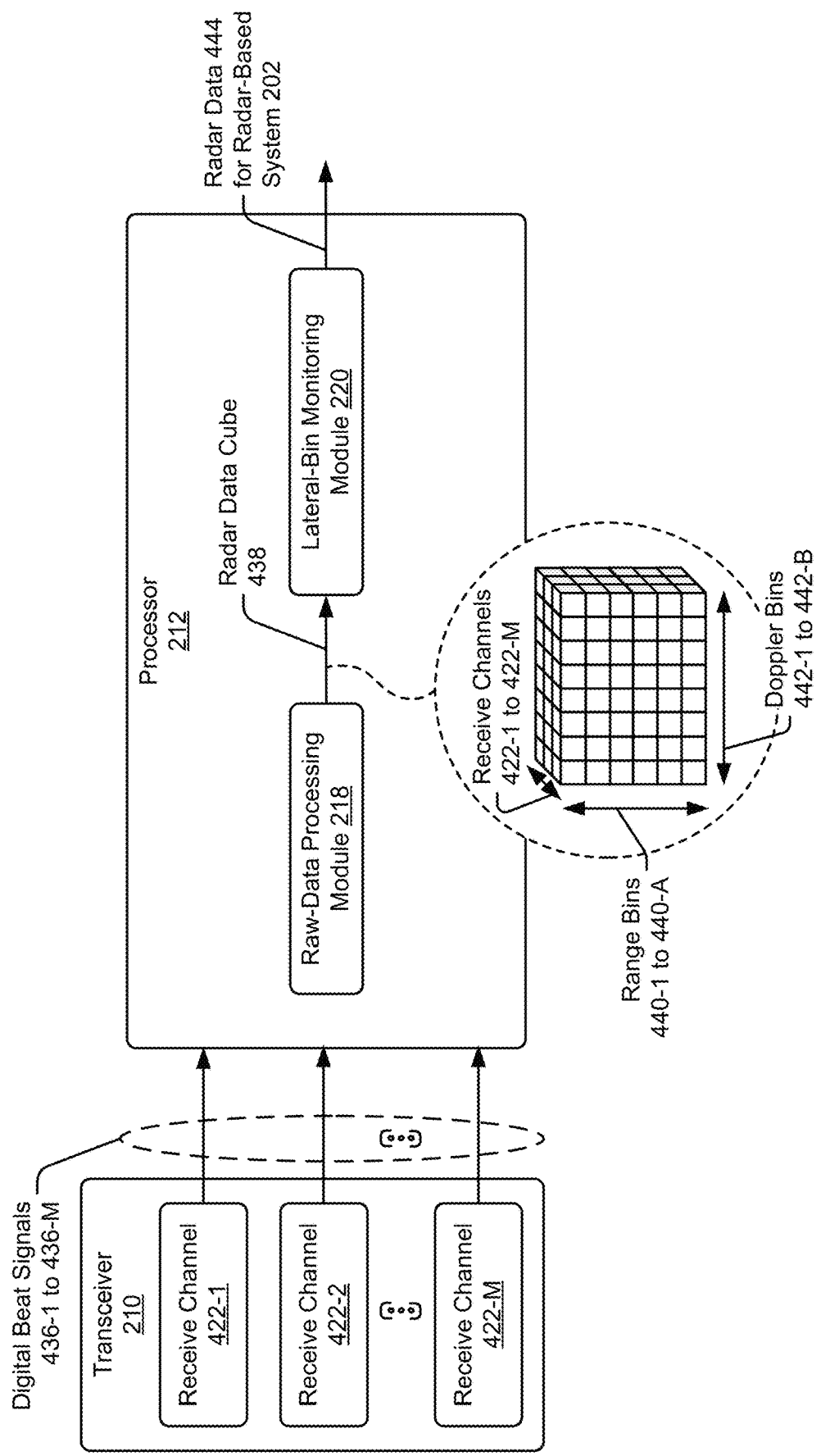

FIG. 4-1 illustrates transmitting portions of an example antenna array 210 and an example transceiver 212 of the radar system 102. In the depicted configuration, the transceiver 212 is coupled between the antenna array 210 and the processor 214 (of FIG. 2). The transceiver 212 includes a transmitter 402, which is coupled to a receiver 404. The transmitter 402 includes one or more transmit channels 406-1 to 406-N, where N is a positive integer.

Each transmit channel 406 can include a voltage-controlled oscillator 408, a phase modulator 410, and at least one power amplifier 412. In this example, the voltage-controlled oscillator 408 is coupled to an input of the phase modulator 410, and an output of the phase modulator 410 is coupled to an input of the power amplifier 412. The receiver 404 is also coupled to the output of the phase modulator 410, as further described with respect to FIG. 4-2. The transmit channels 406-1 to 406-N can also include other components not shown, such as filters, mixers, variable gain amplifiers, and phase shifters.

The antenna array 210 includes one or more transmit antenna elements 414-1 to 414-N. In this implementation, each one of the transmit channels 406-1 to 406-N is coupled to a respective transmit antenna element 414-1 to 414-N. In other implementations, one or more of the transmit channels 406-1 to 406-N are coupled to more than one of the transmit antenna elements 414-1 to 414-N. In this case, the quantity of transmit antenna elements 414-1 to 414-N is greater than the quantity of transmit channels 406-1 to 406-N.

During transmission, the transmitter 402 accepts a control signal 416 from the processor 214 (not shown). Using the control signal 416, the processor 214 directs the transmitter 402 to operate in a particular configuration or operational mode. As an example, the control signal 416 can specify types of waveforms generated by the transmit channels 406-1 to 406-N. Different waveform types can have various quantities of chirps (C), quantities of frames, chirp durations, frame durations, center frequencies, bandwidths, types of frequency modulation (e.g., a single-slope modulation, a two-slope modulation, a linear modulation, or a non-linear modulation), or types of phase modulations (e.g., different orthogonal coding sequences). Additionally, the control signal 416 can specify which transmit channels 406-1 to 406-N are enabled or disabled.

Based on the control signal 416, the voltage-controlled oscillator 408 of the transmit channel 406-1 generates a frequency-modulated radar signal 418 at radio frequencies. The phase modulator 410 modulates phases of the chirps 306-1 to 306-C within the frequency-modulated radar signal 418 to generate a frequency-modulated and phase-modulated radar signal 420. The phases of the chirps 306-1 to 306-C can be determined based on a coding sequence specified by the control signal 416. The power amplifier 412 amplifies the frequency-modulated and phase-modulated radar signal 420 for transmission via the transmit antenna element 414-1. The transmitted frequency-modulated and phase-modulated radar signal 420 is represented by a radar transmit signal 302-1.

Similar operations can be performed by the other transmit channels 406-2 to 406-N to generate the radar transmit signals 302-2 to 302-N. As described above, portions of the radar transmit signals 302-1 to 302-N can have similar waveforms or different waveforms. The radar transmit signals 302-1 to 302-N propagate through space, and portions of the radar transmit signals 302-1 to 302-N are reflected by at least one object 108 (of FIG. 3). The transceiver 212 receives these reflections, as further described with respect to FIG. 4-2.

FIG. 4-2 illustrates receiving portions of the antenna array 210 and the transceiver 212 of the radar system 102. In the depicted configuration, the receiver 404 includes one or more receive channels 422-1 to 422-M, where M represents a positive integer. The quantity of receive channels 422-1 to 422-M may be similar to or different than the quantity of transmit channels 406-1 to 406-N (e.g., M may be greater than, less than, or equal to A).

Each receive channel 422-1 to 422-M includes at least one low-noise amplifier 426, at least one mixer 428, at least one filter 430 (e.g., a band-pass filter or a low-pass filter), and at least one analog-to-digital converter 440. In this example, an input of the mixer 428 is coupled to an output of the low-noise amplifier 426, an output of the mixer 428 is coupled to an input of the filter 430, an output of the filter 430 is coupled to the analog-to-digital converter 440, and an output of the analog-to-digital converter 440 is coupled to the processor 214 (not shown). Another input of the mixer 428 is also coupled to the transmitter 402, such as the output of the phase modulator 410 within one of the transmit channels 406-1 to 406-N. The receive channels 422-1 to 422-M can also include other components (not shown), such as other filters, other mixers, variable gain amplifiers, phase shifters, and so forth.

The antenna array 210 includes one or more receive antenna elements 424-1 to 424-M. In this implementation, each one of the receive channels 422-1 to 422-M is coupled to a respective receive antenna element 424-1 to 424-M. In other implementations, one or more of the receive channels 422-1 to 422-M are coupled to more than one of the receive antenna elements 424-1 to 424-M. In this case, the quantity of receive antenna elements 424-1 to 424-M is greater than the quantity of receive channels 422-1 to 422-M.

During reception, each receive antenna element 424-1 to 424-M receives a version of the radar receive signal 304-1 to 304-M. In general, relative phase differences between these versions of the radar receive signals 304-1 to 304-M are due to differences in locations of the receive antenna elements 424-1 to 424-M. Within each receive channel 422-1 to 422-M, the low-noise amplifier 426 amplifies the radar receive signal 304, and the mixer 428 mixes the amplified radar receive signal 304 with one of the frequency-modulated and phase-modulated radar signal 420 generated by one of the transmit channels 406-1 to 406-N of the transmitter 402. In particular, the mixer 428 performs a beating operation, which downconverts and demodulates the radar receive signal 304 to generate a beat signal 434.

A frequency of the beat signal 434 represents a frequency difference between the frequency-modulated and phase-modulated radar signal 420 (e.g., the radar transmit signal 302) and the radar receive signal 304. This frequency difference is proportional to a slant range between the antenna array 210 and the object 108.

The filter 430 filters the beat signal 434, and the analog-to-digital converter 440 digitizes the filtered beat signal 434. The receive channels 422-1 to 422-M respectively generate digital beat signals 436-1 to 428-M, which are provided to the processor 214 (of FIG. 2) for processing. The receive channels 422-1 to 422-M of the transceiver 212 are coupled to the processor 214, as shown in FIG. 4-3.

FIG. 4-3 illustrates an example scheme implemented by the processor 214 of the radar system 102 for performing lateral-bin monitoring for target detection. In the depicted configuration, the processor 214 implements the raw-data processing module 218 and the lateral-bin monitoring module 220. The processor 214 is connected to the receive channels 422-1 to 422-M.

During reception, the raw-data processing module 218 accepts the digital beat signals 436-1 to 428-M from the receive channels 422-1 to 422-M. The digital beat signals 436-1 to 428-M represent raw or unprocessed complex radar data. The raw-data processing module 218 performs one or more operations to generate a radar data cube 438 based on digital beat signals 436-1 to 428-M. As an example, the raw-data processing module 218 can perform one or more Fourier transform operations, such as a Fast Fourier Transform (FFT) operation. Over time, the raw-data processing module 218 generates multiple radar data cubes 438 for respective frames 308 of the radar receive signal 304.

The radar data cube 438 includes amplitude and/or phase information (e.g., in-phase and quadrature components) associated with different range bins 440-1 to 440-A, Doppler bins 442-1 to 442-B, and receive channels 422-1 to 422-M, where A and B represent positive integers that may or may not be equal to each other. In other words, the radar data cube 438 comprises multiple range-Doppler maps for each receive channel 422-1 to 422-M.

The lateral-bin monitoring module 220 analyzes information within the radar data cube 438 to generate radar data 444 for the radar-based system 202. As an example, the radar data 444 indicates whether or not an object 108 is in a blind spot of the vehicle 104. Operation of the lateral-bin monitoring module 220 is further described with respect to FIGS. 5 to 7.

FIG. 5 illustrates example lateral bins defined by the radar system 102 for lateral-bin monitoring. In general, the radar system 102 monitors at least one region of interest 502 that is on one or more sides of the vehicle 104. In particular, the region of interest incorporates a region of space that is above, below, to the left, to the right, in front of, or behind the vehicle 104. The region of interest 502 can also expand outwards in range and/or angle from the side of the vehicle 104.

In the depicted environment 500, the radar system 102 monitors two regions of interest 502-1 and 502-2. The region of interest 502-1 encompasses a volume of space that is on a left side 504 of the vehicle 104. Similarly, the region of interest 502-2 encompasses another volume of space that is on a right side 506 of the vehicle 104. Other regions of interest 502 are also possible. For instance, another region of interest (not shown) can encompass a volume of space that expands outwards from a front side 508 or a backside 510 of the vehicle 104, or an under side or top side of the vehicle 104 (not shown). In general, the radar system 102 can monitor any quantity of regions of interest that may or may not overlap.

To perform lateral-bin monitoring, the lateral-bin monitoring module 220 defines a plurality of lateral bins associated with the region of interest 502. In this case, the region of interest 502-1 is composed of multiple lateral bins 512-1, 512-2 . . . 512-L, where L is a positive integer. Likewise, the region of interest 502-2 is composed of other lateral bins 514-1, 514-2 . . . 514-R, where R is a positive integer and may or may not be equal to L. As an example, the region of interest 502-1 includes five lateral bins 512 (e.g., L equals 5) with widths of approximately one meter and lengths of approximately ten meters. Dimensions of the lateral bins 514-1 to 514-R can be similar to or different than the dimensions of the lateral bins 512-1 to 512-L.

Generally, the lateral bin 512 or 514 has a length that spans at least a portion of the corresponding side of the vehicle 104. As shown in FIG. 5, the lateral bin 512 or 514 can also extend beyond a side of the vehicle 104. If the vehicle 104 is towing a trailer, the lateral bin 512 or 514 can additionally extend along the side and beyond the backside of the trailer. In some cases, the longest dimension of the lateral bin 512 or 514 is along a direction of motion of the vehicle 104. The lateral bin 512 or 514 is also associated with (e.g., encompasses) one or more range bins 440, one or more angular bins, or a combination thereof. The dimensions of the lateral bins 512 or 514 can be uniform (e.g., all the same) or non-uniform (e.g., different). Additionally, the lateral bins 512 or 514 can form regular shapes or irregular shapes. In some cases, the shapes of the lateral bins 512 or 514 include a rectangular shape, a triangular shape, or a shape with at least one curve. The lateral bins 512 or 514 can also be parallel to one another and parallel to the vehicle 104.

In some implementations, the dimensions of the lateral bins 512 or 514 are fixed and predetermined. As such, the lateral-bin monitoring module 220 can reference a table stored in the CRM 216 (of FIG. 2) to determine the dimensions. In some cases, widths of the lateral bins 512 or 514 can be smaller for lateral bins 512 or 514 that are closer to the vehicle 104 and larger for lateral bins 512 or 514 that are farther from the vehicle 104. In other implementations, the dimensions of the lateral bins 512 or 514 can be adjusted dynamically by the lateral-bin monitoring module 220 based on a speed of the vehicle 104, an estimated speed of the object 108, a direction that the vehicle 104 is moving, vehicle stopping distances, or road conditions.

For example, the length of the lateral bins 512 and 514 can increase if the vehicle 104 speeds up and decrease if the vehicle 104 slows down. This can enable the radar system 102 to normalize the quantity of consecutive frames that the radar system 102 is likely to detect the object 108 based on the vehicle 104's speed. In another example, the length of the lateral bins 512 and 514 can increase when the vehicle 104 is towing a trailer. Likewise, the length of the lateral bins 512 and 514 can be larger for detecting moving objects 110 that may move towards the vehicle 104 and smaller for detecting stationary objects 112. If the radar system 102 is designed to detect both moving objects 110 and stationary objects 112, the lateral-bin monitoring module 220 can define different lateral bins 512 and 514 for the different types of objects 108.

As another example, the lateral-bin monitoring system 220 can rotate the lateral bins 512 or 514 based on the direction the vehicle 104 is moving. If the vehicle 104 moves sideways, for instance, the lateral-bin monitoring system 220 rotates the region of lateral bins 512 or 514 by 90 degrees to increase a probability of detecting objects 108 that are within the path of the vehicle 104. This can also be beneficial to increase a probability of detecting other objects 108 that are approaching the vehicle 104 from the left side 504 or the right side 506. The lateral-bin monitoring module 220 independently monitors each lateral bin 512 and 514 for detections, as further described with respect to FIG. 6.

Figure 6:
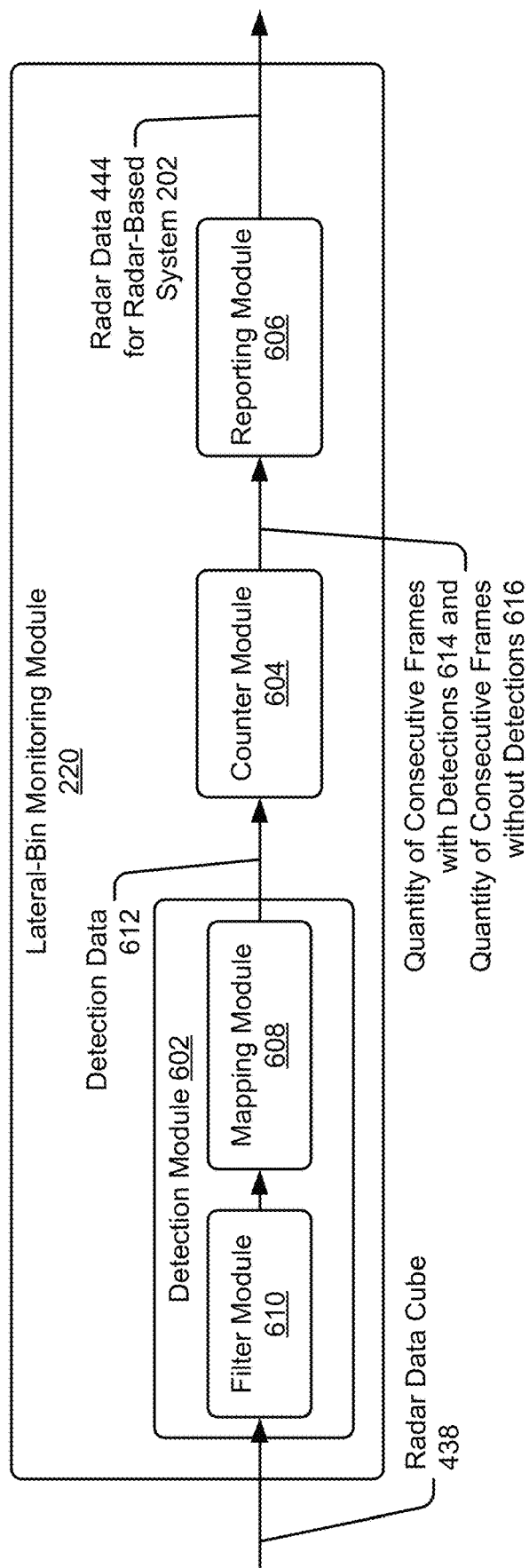
FIG. 6 illustrates an example scheme performed by a lateral-bin monitoring module of a radar system.

FIG. 6 illustrates an example scheme implemented by the lateral-bin monitoring module 220. In the depicted configuration, the lateral-bin monitoring module 220 includes a detection mapping module 602, a counter module 604, and a reporting module 606. The detection module 602 includes a mapping module 608 and an optional filter module 610.

During operation, the detection module 602 analyzes the radar data cube 438 and generates detection data 612, which indicates whether or not a detection is located within each lateral bin 512 or 514 (of FIG. 5) for the frame 308 associated with the radar data cube 438. If the detection module 602 includes the filter module 610, the filter module 610 can identify detections that have desired characteristics. For detecting stationary objects 112, for example, the filter module 610 can pass along information about detections within the radar data cube 438 that have Doppler frequencies that represent range rates of 0.5 meters per second or less. In this way, the lateral-bin monitoring module 220 can determine that the object 108 is associated with a road barrier, such as any of the road barriers described above with respect to FIG. 1. Alternatively, for detecting moving objects 110, the filter module 610 can pass along information about detections that have Doppler frequencies that represent range rates that are greater than or equal to a particular range-rate threshold.

The mapping module 608 processes the detections that are identified by the filter module 610 and determines the location of each detection (e.g., the range and angle associated with each detection). The mapping module 608 also maps the location of each detection to one of the lateral bins 512 or 514. Based on this mapping, the mapping module 608 generates detection data 612, which identifies which lateral bins 512 or 514 have detections and which lateral bins 512 or 514 do not have detections.

The counter module 604 updates counters based on the detection data 612. For each lateral bin 512 and 514, the counter module 604 maintains a counter that represents a quantity of consecutive frames with detections 614 and another counter that represents a quantity of consecutive frames without detections 616. These quantities are provided to the reporting module 606.

The reporting module 606 compares the quantities of consecutive frames with detections 614 or the quantities of consecutive frames without detections 616 to different thresholds to update states of the lateral bins 512 and 514, and to determine whether or not the object 108 is present within one or more of the lateral bins 512 and 514. Based on this comparison, the reporting module 606 generates the radar data 444 for the radar-based system 202. The different states of the lateral bins 512 and 514 are further described with respect to FIG. 7.

Figure 7:
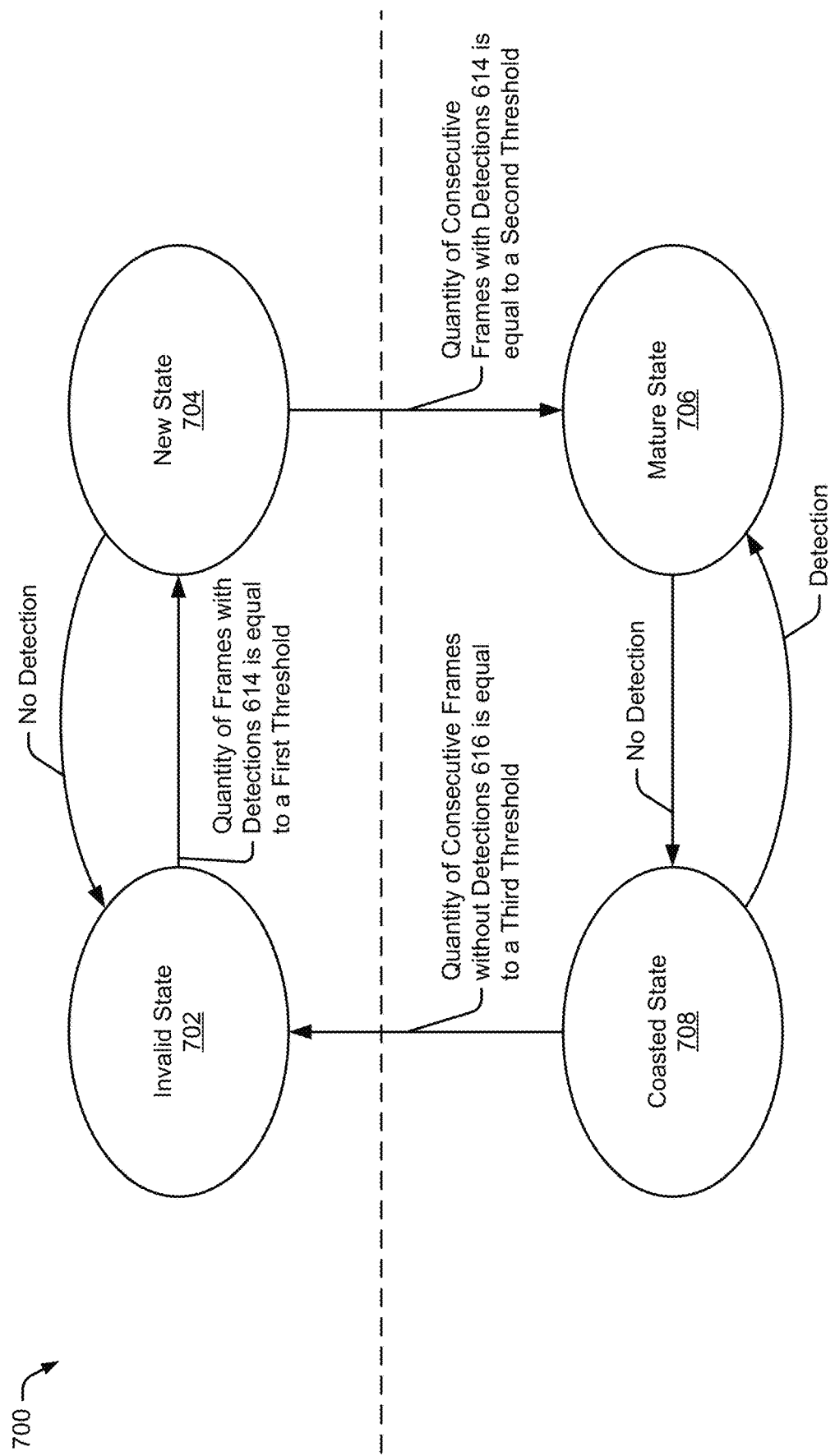
FIG. 7 illustrates an example state diagram for a lateral bin.

FIG. 7 illustrates an example state diagram 700 of a lateral bin 512 or 514. In an example implementation, the lateral bin 512 or 514 can be in an invalid state 702, a new state 704, a mature state 706, or a coasted state 708, as determined by the reporting module 606. The invalid state 702 indicates that no object 108 is present within the lateral bin 512 or 514. The new state 704 indicates that an object 108 may be present within the lateral bin 512 or 514, however, the lateral bin 512 or 514 is to be monitored for additional frames 308 before declaring that the object 108 is present. In contrast, the mature state 706 indicates that the object 108 is present within the lateral bin 512 or 514. The coasted state 708 indicates that the object 108 was present within the lateral bin 512 or 514, however, the lateral bin 512 or 514 is to be observed for additional frames to determine if the object 108 is no longer present.

In general, the reporting module 606 determines that the object 108 is present if the lateral bin 512 or 514 is in the mature state 706 or the coasted state 708. In contrast, the reporting module 606 determines that the object 108 is not present if the lateral bin 512 or 514 is in the invalid state 702 or the new state 704.

Transitions between the different states are based on the quantity of consecutive frames with detections 614 and the quantity of consecutive frames without detections 616. During initialization, all of the lateral bins 512 and 514 are in the invalid state 702. If the quantity of frames with detections is equal to a first threshold, the reporting module 606 updates the state of the lateral bin 512 or 514 from the invalid state 702 to the new state 704.

While in the new state 704, the quantity of consecutive frames with detections 614 may be reset to zero responsive to next frame 308 having no detections within the lateral bin 512 or 514. In this situation, the reporting module 606 updates the state of the lateral bin 512 or 514 from the new state 704 to the invalid state 702. Alternatively, if the quantity of consecutive frames with detections 614 equals a second threshold, the reporting module 606 updates the state of the lateral bin 512 or 514 from the new state 704 to the mature state 706.

While in the mature state 706, the quantity of consecutive frames with detections 614 may be reset to zero responsive to a frame having no detections within the lateral bin 512 or 514. In this situation, the reporting module 606 updates the state of the lateral bin 512 or 514 from the mature state 706 to the coasted state 708. Otherwise, the lateral bin 512 or 514 remains in the mature state 706.

While in the coasted state 708, if the quantity of consecutive frames without detections 616 is equal to a third threshold, the reporting module 606 updates the state of the lateral bin 512 or 514 from the coasted state 708 to the invalid state 702. However, if a detection is detected during one frame 308, the reporting module 606 updates the state of the lateral bin 512 or 514 from the coasted state 708 to the mature state 706 and resets the quantity of consecutive frames without detections 616 to zero.

The first threshold, the second threshold, and the third threshold can be predetermined based on the dimensions of the lateral bins 512 and 514 or an estimated speed of the object 108 (e.g., whether the object 108 is a moving object 110 or a stationary object 112). In general, the second threshold is larger than the first threshold. As an example, the first threshold can be equal to three, the second threshold can be equal to five, and the third threshold can be equal to ten. These values can be adjusted to achieve a desired false-alarm rate and level of responsiveness.

Example Method

Figure 8:
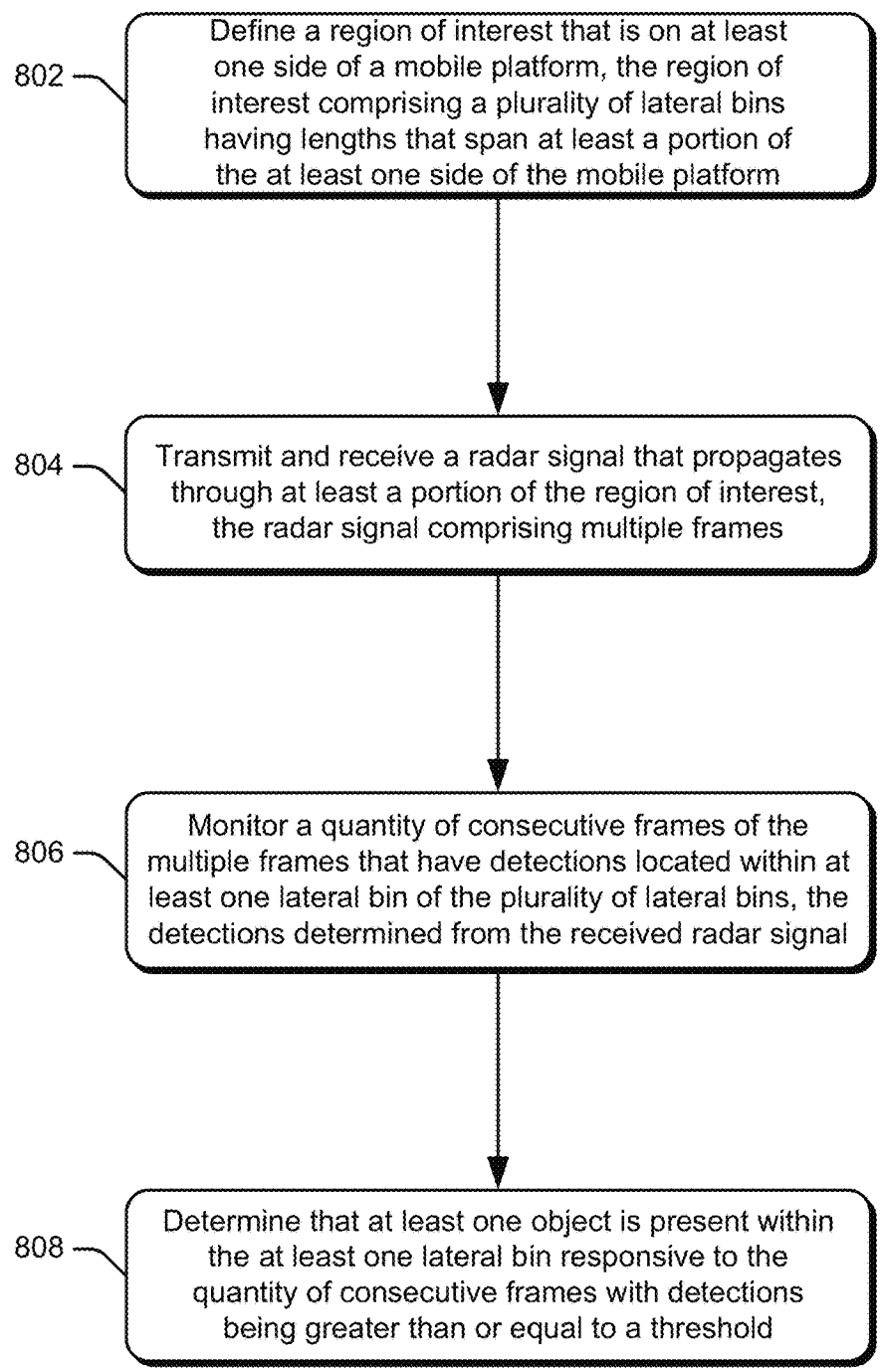
FIG. 8 illustrates an example method of a radar system for performing lateral-bin monitoring for target detection.

FIG. 8 depicts an example method 800 for performing lateral-bin monitoring for target detection. Method 800 is shown as sets of operations (or acts) performed but not necessarily limited to the order or combinations in which the operations are shown herein. Further, any of one or more of the operations may be repeated, combined, or reorganized to provide other methods. In portions of the following discussion, reference may be made to the environment 100 of FIG. 1, and entities detailed in FIGS. 2, 4-1, 4-2, 4-3, and 6, reference to which is made for example only. The techniques are not limited to performance by one entity or multiple entities.

At 802, a region of interest is on at least one side of a mobile platform. The region of interest comprises a plurality of lateral bins having lengths that span at least a portion of the at least one side of the mobile platform. For example, the lateral-bin monitoring module 220 of the radar system 102 defines the region of interest 502, which is on at least one side of the vehicle 104, as shown in FIG. 5. The region of interest 502 includes a plurality of lateral bins 512 or 514, which have lengths that span at least a portion of the at least one side of the vehicle 104. Generally, the lateral bin 512 or 514 encompasses one or more range bins 440, one or more angular bins, or a combination thereof. The vehicle 104 is located outside of the region of interest 502.

At 804, a radar signal that propagates through at least a portion of the region of interest is transmitted and received. The radar signal comprises multiple frames. For example, the radar system 102 transmits the radar transmit signal 302 using at least one transmit channel 406 of the transmitter 402 and at least one transmit antenna element 414 of the antenna array 210, as shown in FIG. 4-1. In some implementations, the radar system 102 performs MIMO operations and transmits multiple radar transmit signals 302-1 to 302-N with distinct waveforms. The radar transmit signal 302 includes multiple chirps 306-1 to 306-C, whose frequencies are modulated, as shown in FIG. 3. A frame 308 represents a group of chirps 306-1 to 306-C.

Additionally, the radar system 102 receives the radar receive signal 304 using at least one receive channel 422 of the receiver 404 and at least one receive antenna element 424 of the antenna array 210, as shown in FIG. 4-2. The radar receive signal 304 is a reflected version of the radar transmit signal 302, as shown in FIG. 3. Both the radar transmit signal 302 and the radar receive signal 304 include multiple frames 308.

At 806, a quantity of consecutive frames of the multiple frames that have detection located within at least one lateral bin of the plurality of lateral bins is monitored based on the received radar signal. The detections are determined from the received radar signal. For example, the lateral-bin monitoring module 220 monitors a quantity of consecutive frames with detections 614 associated with each of the lateral bins 512 or 514. The detections are determined from the radar receive signal 304. The lateral-bin monitoring module 220 further updates a state of each of the lateral bins 512 or 514 based on the corresponding quantity of consecutive frames with detections 614 and the quantity of consecutive frames without detections 616, as described with respect to FIG. 7.

At 808, at least one object is determined to be present within the at least one lateral bin responsive to the quantity of consecutive frames with detections being greater than or equal to a threshold. For example, the lateral-bin monitoring module 220 determines that the object 108 is present within one of the lateral bins 512 or 514 responsive to the quantity of consecutive frames with detections 614 being equal to or greater than the second threshold, as described with respect to FIG. 7.

The lateral-bin monitoring module 220 can also determine whether the object 108 is a stationary object 112 or a moving object 110. For example, the lateral-bin monitoring module 220 can use the filter module 610 to pass detections associated with stationary objects 112 or moving objects 110. In some cases, the lateral-bin monitoring module 220 can also identify different types of stationary objects 112 and moving objects 110 based on the quantity of consecutive frames with detections 614. For example, the second threshold can be larger for detecting a road barrier and smaller for detecting a signpost. Similarly, the second threshold can be larger for detecting a semi-trailer truck 110-2 and smaller for detecting the vehicle 110-1.

As an example, the lateral-bin monitoring module 220 can determine that the object 108 is associated with one of the road barriers described above with respect to FIG. 1 by using the filter module 610 to pass detections with range rates that are less than or equal to 0.5 meters per second and by setting the second threshold to be equal to five. In this case, the second threshold of five was previously determined during simulation or testing to be sufficient for identifying road barriers based on the lateral bins 512 or 514 having lengths of approximately ten meters. In some cases, the second threshold dynamically changes based on the speed of the vehicle 104.

Some examples are described below.

EXAMPLE 1

A method performed by a radar system that is mounted to a mobile platform, the method comprising:
  defining a region of interest that is on at least one side of the mobile platform, the region of interest comprising a plurality lateral bins having lengths that span at least a portion of the at least one side of the mobile platform;
  transmitting and receiving a radar signal that propagates through at least a portion of the region of interest, the radar signal comprising multiple frames;
  monitoring a quantity of consecutive frames of the multiple frames that have detections located within at least one lateral bin of the plurality of lateral bins, the detections determined from the received radar signal; and determining that at least one object is present within the at least one lateral bin responsive to the quantity of consecutive frames with detections being greater than or equal to a threshold.

EXAMPLE 2

The method of example 1, wherein the mobile platform comprises a vehicle.

EXAMPLE 3

The method of example 2, further comprising:
responsive to the determining that the at least one object is present within the at least one lateral bin, outputting an indication of the at least one object to a radar-based system of the vehicle to enable the radar-based system to alert a driver to a presence of the at least one object.

EXAMPLE 4

The method of example 2, further comprising:
responsive to the determining that the at least one object is present within the at least one lateral bin, determining that the at least one object is associated with a road barrier; and
outputting an indication of the road barrier to a radar-based system of the vehicle to enable the radar-based system of the vehicle to suppress an alert.

EXAMPLE 5

The method of example 1, wherein:
the at least one lateral bin comprises a first lateral bin and a second lateral bin; and
the monitoring of the quantity of consecutive frames comprises:
monitoring a first quantity of consecutive frames that have a first set of the detections within the first lateral bin; and
monitoring a second quantity of consecutive frames that have a second set of the detections within the second lateral bin.

EXAMPLE 6

The method of example 1, wherein the monitoring comprises:
determining that the quantity of consecutive frames with detections is equal to another threshold, the other threshold being smaller than the threshold; and
updating a state of the at least one lateral bin from an invalid state to a new state, the new state indicating that the quantity of consecutive frames with detections is greater than or equal the other threshold, the invalid state representing an initial state of the at least one lateral bin.

EXAMPLE 7

The method of example 6, wherein the monitoring further comprises:
after updating the state of the at least one lateral bin from the invalid state to the new state, determining that the quantity of consecutive frames with detections is equal to the threshold; and updating the state of the at least one lateral bin from the new state to a mature state, the mature state indicating that the quantity of consecutive frames with detections is greater than or equal to the threshold.

EXAMPLE 8

The method of example 7, wherein the determining that the at least one object is present within the at least one lateral bin is responsive to the at least one lateral bin being in the mature state.

EXAMPLE 9

The method of example 7, wherein the monitoring further comprises:
after updating the state of the at least one lateral bin from the new state to the mature state, resetting the quantity of consecutive frames with detections to zero responsive to a next frame of the multiple frames having no detections within the at least one lateral bin; and
updating the state of the at least one lateral bin from the mature state to a coasted state responsive to the quantity of consecutive frames with detections being reset to zero, the coasted state indicating that the at least one lateral bin was previously in the mature state prior to the next frame having no detections.

EXAMPLE 10

The method of example 9, wherein the monitoring further comprises:
after updating the state of the at least one lateral bin from the mature state to the coasted state, monitoring a quantity of consecutive frames having no detections located within the at least one lateral bin; and
updating the state of the at least one lateral bin from the coasted state to the invalid state based on the quantity of consecutive frames without detections being equal to an additional threshold.

EXAMPLE 11

The method of example 6, wherein the monitoring further comprises:
after updating the state of the at least one lateral bin from the invalid state to the new state, resetting the quantity of consecutive frames with detections to zero responsive to a next frame of the multiple frames having no detections within the at least one lateral bin; and
updating the state of the at least one lateral bin from the new state to the invalid state responsive to the quantity of consecutive frames with detections being reset to zero.

EXAMPLE 12

An apparatus comprising:
a radar system comprising:
at least one antenna array;
a transceiver coupled to the at least one antenna array, the transceiver configured to transmit and receive a radar signal using the antenna array, the radar signal propagating through at least a portion of a region of interest, the radar signal comprising multiple frames; and a processor coupled to the transceiver, the processor configured to:
- define the region of interest, the region of interest being on at least one side of the apparatus, the region of interest comprising a plurality of lateral bins having lengths that span at least a portion of the at least one side of the apparatus;
- monitor a quantity of consecutive frames of the multiple frames that have detections located within the at least one lateral bin, the detections determined from the received radar signal; and
- determine that at least one object is present within the at least one lateral bin responsive to the quantity of consecutive frames with detections being greater than or equal to a threshold.

EXAMPLE 13

The apparatus of example 12, wherein the apparatus comprises a vehicle.

EXAMPLE 14

The apparatus of example 13, wherein:
the radar system comprises:
- a first rear-mounted radar system positioned towards a left side of the vehicle; and
- a second rear-mounted radar system positioned towards a right side of the vehicle; and the at least one side comprises both the left side and the right side.

EXAMPLE 15

The apparatus of example 12, wherein:
widths of the plurality of lateral bins are approximately one meter; and
the lengths of the plurality of lateral bins are approximately ten meters.

EXAMPLE 16

The apparatus of example 12, wherein the at least one object comprises at least one of the following:
- a moving object; or
- a stationary object.

EXAMPLE 17

Computer-readable storage media comprising computer-executable instructions that, responsive to execution by a processor, implement:
a lateral-bin monitoring module configured to:
- accept multiple radar data cubes respectively associated with multiple frames of a radar receive signal;
- monitor quantities of consecutive frames having detections located within respective lateral bins, the detections determined based on the multiple radar data cubes, the quantities of consecutive frames comprising a particular quantity of consecutive frames having detections located within a particular lateral bin of the respective lateral bins; and
- determine that at least one object is present within the particular lateral bin responsive to the particular quantity of consecutive frames with detections being greater than or equal to a threshold.

EXAMPLE 18

The computer-readable storage media of example 17, wherein:
the computer-executable instructions implement a raw-data processing module configured to:
- accept digital beat signals derived from the radar receive signal; and
- generate the multiple radar data cubes based on the digital beat signals, the multiple radar data cubes respectively associated with the multiple frames of the radar receive signal; and the multiple radar data cubes comprise amplitude and phase information associated with different range bins, different Doppler bins, and at least one receive channel.

EXAMPLE 19

The computer-readable storage media of example 17, wherein:
the lateral-bin monitoring module is configured to map locations of the detections to the respective lateral bins based on information contained within the multiple radar data cubes and dimensions of the respective lateral bins; and
the dimensions of the respective lateral bins encompass multiple range bins or multiple angular bins.

EXAMPLE 20

The computer-readable storage media of example 17, wherein the lateral-bin monitoring module is configured to:
- update a state of the particular lateral bin from an invalid state to a new state responsive to the particular quantity of consecutive frames with detections being equal to another threshold, the other threshold being smaller than the threshold;
- update the state of the particular lateral bin from the new state to a mature state responsive to the particular quantity of consecutive frames with detections being equal to the threshold;
- update the state of the particular lateral bin from the mature state to a coasted state responsive to resetting the particular quantity of consecutive frames to zero;
- update the state of the particular lateral bin from the coasted state to the invalid state responsive to a quantity of consecutive frames without detections being equal to an additional threshold; and
- determine that the at least one object is present within the particular lateral bin responsive to the particular lateral bin being in the mature state or the coasted state.

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

What is claimed is:
1. A processor of a radar system configured to:
define a region of interest comprising a plurality of lateral bins having lengths that span the region of interest;
cause the radar system to transmit and receive multiple frames of a radar signal that propagates through the region of interest;

monitor the radar signal for a quantity of consecutive frames of the multiple frames that have detections located within at least one lateral bin of the plurality of lateral bins; and determine that at least one object is present within the at least one lateral bin responsive to the quantity of consecutive frames being greater than or equal to a threshold.

2. The processor of claim 1, wherein:

the radar system is mounted to a vehicle; and the processor is further configured to output, responsive to a determination that the at least one object is present within the at least one lateral bin, an indication of the at least one object to a radar-based system of the vehicle to enable the radar-based system to alert a driver to a presence of the at least one object.

3. The processor of claim 2, the processor further configured to:

responsive to the determination that the at least one object is present within the at least one lateral bin, determine that the at least one object is associated with a road barrier; and output an indication of the road barrier to the radar-based system of the vehicle to enable the radar-based system of the vehicle to suppress an alert.

4. The processor of claim 1, wherein:

the at least one lateral bin comprises a first lateral bin and a second lateral bin; and the processor is configured to monitor the quantity of consecutive frames by:

monitoring a first quantity of consecutive frames that have a first set of the detections within the first lateral bin; and monitoring a second quantity of consecutive frames that have a second set of the detections within the second lateral bin.

5. The processor of claim 1, wherein the processor is further configured to generate multiple radar data cubes from the received radar signal, the multiple radar data cubes respectively associated with the multiple frames of the received radar signal, the multiple radar data cubes comprising amplitude and phase information associated with different range bins and different Doppler bins.

6. The processor of claim 1, wherein the plurality of lateral bins have a length that is greater than a length of a side of a vehicle to which the radar system is mounted.

7. The processor of claim 1, wherein the plurality of lateral bins have a length that is greater than a length of a vehicle to which the radar system is mounted and a length of a trailer towed by the vehicle.

8. The processor of claim 1, wherein:

the plurality of lateral bins comprises a first lateral bin and a second lateral bin, the first lateral bin closer to a side of a vehicle to which the radar system is mounted than the second lateral bin; and a length of the first lateral bin is smaller than a length of the second lateral bin.

9. The processor of claim 1, wherein the processor is further configured to dynamically adjust a length of the plurality of lateral bins.

10. The processor of claim 9, wherein the processor is configured to dynamically adjust the length of the plurality of lateral bins based on at least one of:

a speed of a vehicle to which the radar system is mounted;

an estimated speed of the at least one object; or road conditions of a roadway on which the vehicle is traveling.

11. The processor of claim 1, wherein the processor is further configured to rotate the plurality of lateral bins based on a travel direction of a vehicle to which the radar system is mounted.

12. Non-transitory computer-readable storage media comprising computer-executable instructions that, responsive to execution by a processor of a radar system, cause the processor to:

define a region of interest comprising a plurality of lateral bins having lengths that span the region of interest;

cause the radar system to transmit and receive multiple frames of a radar signal that propagates through the region of interest;

monitor the radar signal for a quantity of consecutive frames of the multiple frames that have detections located within at least one lateral bin of the plurality of lateral bins; and determine that at least one object is present within the at least one lateral bin responsive to the quantity of consecutive frames being greater than or equal to a threshold.

13. The non-transitory computer-readable storage media of claim 12, wherein the plurality of lateral bins have a length that is greater than a length of a side of a vehicle to which the radar system is mounted.

14. The non-transitory computer-readable storage media of claim 12, wherein the plurality of lateral bins have a length that is greater than a length of a vehicle to which the radar system is mounted and a length of a trailer towed by the vehicle.

15. The non-transitory computer-readable storage media of claim 12, wherein:

the plurality of lateral bins comprises a first lateral bin and a second lateral bin, the first lateral bin closer to a side of a vehicle to which the radar system is mounted than the second lateral bin; and a length of the first lateral bin is smaller than a length of the second lateral bin.

16. The non-transitory computer-readable storage media of claim 12, wherein the computer-readable storage media comprise further computer-executable instructions that, responsive to execution by the processor, cause the processor to dynamically adjust a length of the plurality of lateral bins based on at least one of:

a speed of a vehicle to which the radar system is mounted;

an estimated speed of the at least one object; or road conditions of a roadway on which the vehicle is traveling.

17. The non-transitory computer-readable storage media of claim 12, wherein the computer-readable storage media comprise further computer-executable instructions that, responsive to execution by the processor, cause the processor to rotate the plurality of lateral bins based on a travel direction of a vehicle to which the radar system is mounted.

18. A method comprising:

defining a region of interest comprising a plurality of lateral bins having lengths that span the region of interest;

transmitting and receiving multiple frames of a radar signal that propagates through the region of interest;

monitoring the radar signal for a quantity of consecutive frames of the multiple frames that have detections located within at least one lateral bin of the plurality of lateral bins; and determining that at least one object is present within the at least one lateral bin responsive to the quantity of consecutive frames being greater than or equal to a threshold.

19. The method of claim 18, wherein the plurality of lateral bins have a length that is greater than a length of a side of a vehicle to which the radar system is mounted.

20. The method of claim 18, wherein:
the plurality of lateral bins comprises a first lateral bin and a second lateral bin, the first lateral bin closer to a side of a vehicle to which the radar system is mounted than the second lateral bin; and
a length of the first lateral bin is smaller than a length of the second lateral bin.

* * * * *